United States Patent

Ihrig et al.

[15] 3,645,712

[45] Feb. 29, 1972

[54] RADIATION TARGET STRUCTURE AND USE TO COOL MOLTEN GLASS

[72] Inventors: Allen C. Ihrig; Richmond W. Wilson, both of Corning, N.Y.

[73] Assignee: Corning Glass Works, Corning, N.Y.

[22] Filed: May 6, 1970

[21] Appl. No.: 35,055

[52] U.S. Cl. ..................................65/83, 65/137, 65/204, 65/337, 65/347
[51] Int. Cl. ............................................C03b 5/22
[58] Field of Search....................65/83, 137, 204, 337, 346, 65/347

[56] References Cited

UNITED STATES PATENTS 3,223,502  12/1965  Ward et al. ............................65/83 X

FOREIGN PATENTS OR APPLICATIONS 812,308  2/1937  France......................................65/83

Primary Examiner—Arthur D. Kellogg
Attorney—Clarence R. Patty, Jr. and Ernst H. Ruf

[57] ABSTRACT

Adjustable, thin, fluid-cooled radiation targets are provided for selectively cooling the center surface portion of a molten glass stream in a glass making furnace forehearth. These radiation targets, which are generally of truncated triangular shape when viewed from an end in a direction parallel to the glass stream, may be arranged in tandem along the glass stream center surface portion, with each target having a plurality of connected wall panels defining a low-profile-closed chamber including a top portion spaced a substantial distance below the forehearth roof and inwardly converging side portions spaced a substantial distance from the glass stream edges. A plurality of spaced baffles within the closed chamber, and together therewith, define a circuitous fluid passageway having fluid entry and exit ports on the opposite ends thereof. Means are provided for supplying and removing a cooling fluid and further means control the degree of cooling imparted by the radiation target. A method for cooling the glass surface center portion includes positioning the radiation targets within a preselected region above the glass surface center portion and controlling the degree of cooling of the radiation targets.

5 Claims, 7 Drawing Figures

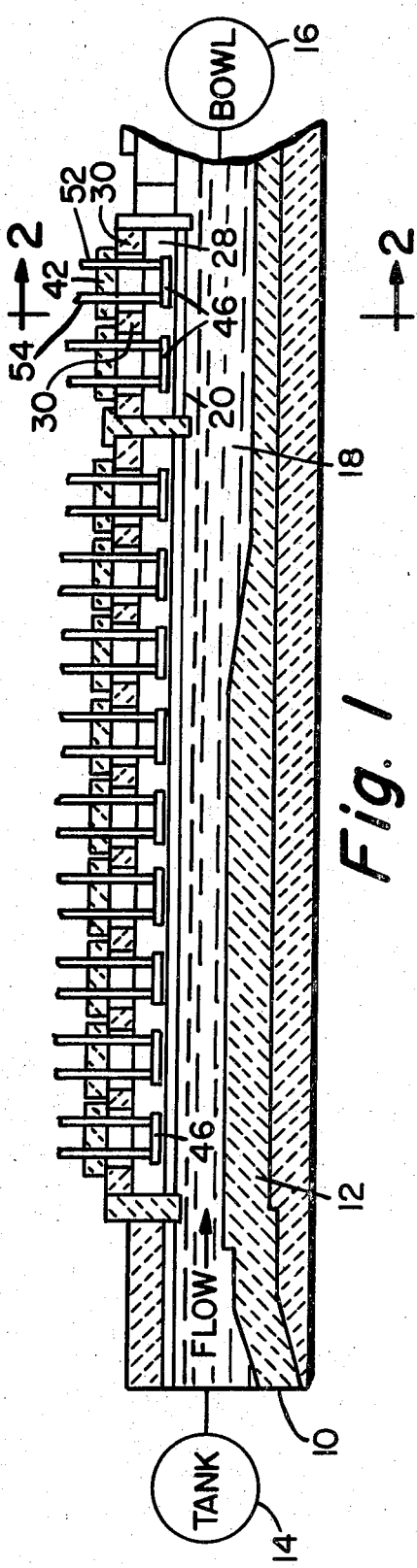
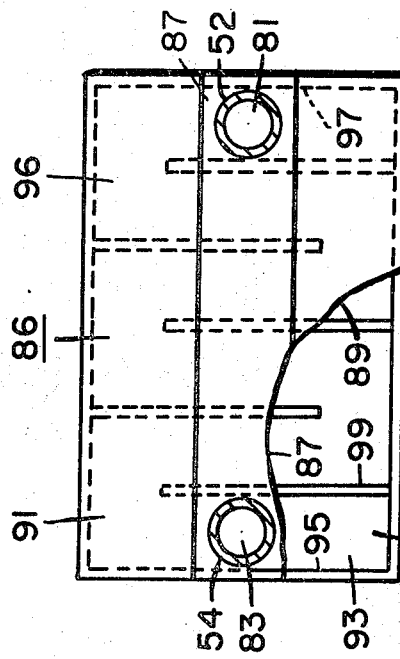
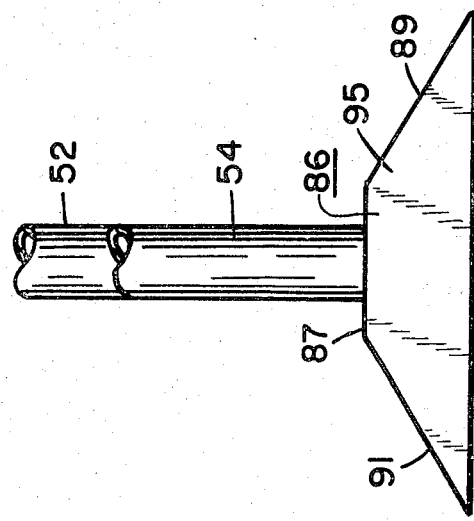
INVENTORS.
Allen C. Ihrig
Richmond W. Wilson
ATTORNEY INVENTORS.
Allen C. Ihrig
Richmond W. Wilson
BY Ernst W. Ruf
ATTORNEY INVENTORS.
Allen C. Ihrig
Richmond W. Wilson

RADIATION TARGET STRUCTURE AND USE TO COOL MOLTEN GLASS

BACKGROUND OF THE INVENTION

1. Field of the Invention

The present invention relates to radiation targets and more particularly to low profile, vertically adjustable fluid-cooled radiation targets of high-heat conductive material designed to provide means for selectively cooling essentially only the center surface portion of a stream of molten glass in a glass making furnace forehearth.

2. Description of the Prior Art

Normally, in a glass furnace forehearth, where considerable glass cooling is required to provide a given viscosity for the various forming processes, a major portion (approximately three-quarters) of the total cooling is achieved through heat losses from the exposed glass surface. The remaining portion, (or approximately one-quarter) of the heat loss occurs due to conduction through the container walls which are normally well insulated to permit controlled cooling. A majority of the heat leaving the glass surface radiates to the cooler inner surfaces of the superstructure refractory. From here the heat flows to the outside of the superstructure refractory by conduction, and thence is removed by radiation and convection to the surrounding atmosphere. The amount of cooling achieved is greatly influenced by the temperature differential between the relatively hot glass surface and the somewhat cooler refractory surface.

Cooling may be increased by cooling the superstructure refractory with airblown across the superstructure surface as in a wind-cooled forehearth, such as shown, for example, in U.S. Pat. No. 2,649,903 to Russell. Wind cooling, such as this, while beneficial from a cooling standpoint sometimes creates troublesome control problems due to differential pressures created which vary from one section of the forehearth to another and due to a parabolic velocity distribution of the surface glass. This differential pressure results in a longitudinal flow of combustion products or cooling air, and creates undesired temperature changes and control cycling. In wind cooling, the edge glass, which is moving very very slowly, is cooled while simultaneously trying to cool the relatively hot and faster moving center glass, thus requiring additional expensive energy from the firing system to restore the heat lost in the edge glass.

A further problem encountered in wind-cooled forehearths is the effect of control upsets created by differential pressures in adjacent cooling zones of the forehearth. This difficulty results in a longitudinal flow of air and products of combustion which influence the primary elements, unintentionally creating cyclic control problems. In addition, wind-cooled forehearth construction costs are expensive because of ductwork, wind-cooled blowers, boxes, and refractory ports.

A number of prior art attempts have been made to achieve selective glass surface cooling by the use of radiant-type cooling means. While these have been partially successful they have also been subject to certain shortcomings and disadvantages. U.S. Pat. No. 1,634,802 to Small et al., shows the use of a cooler, comprising a large fluid-cooled tubular metallic casing (without the use of baffles) positioned closely adjacent the surface of molten glass before it passes under a jack-arch into a draw pot. While this cooler does absorb heat from the supper strata of the molten glass flowing thereunder, it extends across the entire width of the glass stream thereby undesirably cooling the already cooler glass edges and in addition there are no provisions for height adjustment.

U.S. Pat. No. 1,893,061 to Peiler, discloses the use of multiple metallic cover plates which cover the openings in the superstructure above the glass at the longitudinal median line of the forehearth. While these cover plates, which may be cooled, are claimed to reduce the temperature of the glass along the longitudinal median portion of the forehearth channel, they also tend to cool the edge portion of the glass by reason of their substantial spacing from the glass surface. Furthermore these cover plates are of a fixed position design thus permitting no variation in the degree of cooling by varying their effective height.

U.S. Pat. No. 3,241,940 to Zellers Jr., shows the utilization of an open-ended hollow muffle lip-tile of generally rectangular cross section for radiating heat to the surface of a molten glass bath. While the amount of heat so radiated can be controlled by varying the amount of heat so introduced and by raising and lowering the lip-tile, it should be noted that the lip tile extends across the entire width of the glass bath therefore even further heating the already hotter bath surface center portion.

U.S. Pat. No. 1,923,942 to Lufkin discloses several embodiments of adjustable cooling means for lowering glass temperatures. In FIG. 8 there is illustrated an embodiment wherein a boxlike structure of refractory material extends downwardly, through an opening in the roof structure. The interior of the box constitutes a temperature regulating chamber having inlet and outlet openings for the circulation of air or other heat regulating medium. A central shaft provides a means for lifting and lowering the box which may be adjusted to position its lower surface at any desired distance above or below the level of the glass. While this boxlike structure may be positioned as noted above, it should be noted that it is made of refractory material rather than of a preferably high-heat conductive material. In addition, its sidewalls extend vertically up to and pass through the roof structure opening thus presenting a large side surface area which exerts an undesirable cooling effect on the already cooler glass surface edges.

U.S. Pat. No. 1,547,910 to Ferngren discloses a method and apparatus for drawing sheet glass. A cooling apparatus for congealing the surface layer on molten glass shown in FIGS. 6 and 7, consists of a series or banks of separate cooling units, with each cooler comprising a metallic casing suspended from a pipe adjustable vertically through a roof plate. The pipe is adjustable to regulate the proximity of the lower end of the cooler to the surface of the molten glass. Cooling fluid is circulated through the coolers and these coolers are arranged in a series of transverse rows across the glass sheet and as the elevation of any single unit can be individually adjusted, the cooling effect on the surface of the glass pool may be regulated as desired. While this system is workable it again suffers from several defects. First of all, the coolers are arranged in a series of transverse rows across the glass sheet thereby undesirably cooling the glass edge portions. Secondly, even if the cooler were arranged only along the center portion of glass sheet, their top surfaces are spaced a substantial distance above the glass surface thereby exposing relatively large side surface areas, which again exert undesirable cooling effects on the already cooler glass sheet edges. Thirdly, the bottom surface portions of these coolers, i.e., the surfaces exposed to the glass sheet are quite small in comparison with the cooler total surface area, thus giving relatively low cooling efficiencies.

SUMMARY OF THE INVENTION

This invention solves the previously mentioned problems by not only relieving the edge cooling and control problems associated with wind cooling but also by providing selective cooling of essentially only the center surface portion of the molten glass stream in a glass furnace forehearth.

Basically this invention comprises adjustable thin fluid-cooled radiation targets in generally flat panel form. These radiations targets, preferably used in a multiple tandem arrangement, selectively reduce the temperature of the hotter faster moving glass center surface portion, flowing down the center of the forehearth, by providing a relatively cold target for the radiation of heat from this surface portion. When the radiation target is positioned within, for example, an inch of the glass surface, only the surface of the glass which passes directly under the target will be cooled. This occurs because the side surfaces of the target are spaced a substantial distance from the forehearth channel edges. In addition, the top surface of the target is spaced a substantial distance below the forehearth roof structure (and close to the bottom surface of the target), thereby producing very small side surface areas that contribute only a very small component to the total radiation width of the radiation targets. If the side surfaces are angled, as taught in one embodiment of this invention, they contribute virtually no components to the total effective radiation width.

One advantage of this invention is that it reduces forehearth fuel costs by selectively removing heat from only the fast moving glass center surface portion and retaining heat in the slow-moving edge glass, thus reducing burner input energy and permitting a shorter forehearth for a given amount of cooling.

A further advantage of this invention is that by permitting heat removal from only the hot, fast-moving center glass portion, it minimizes channelling and permits more rapid control of forehearth conditions.

It is a further advantage of this invention that it improves the glass flow front, thereby minimizing operational and quality problems, by providing more nearly uniform flow velocities and temperature profiles across the forehearth channel to enable the transfer of more uniformly conditioned glass to the bowl and delivery system.

Other advantages and features of this invention will appear from the following description taken in connection with the associated drawings.

BRIEF DRAWING DESCRIPTION

FIG. 1 is a longitudinal, vertical, sectional view of a glass making furnace forehearth utilizing a plurality of one embodiment of the thin, adjustable, fluid-cooled radiation targets of this invention.

FIG. 5 is an end view of a further embodiment of the thin, adjustable, fluid-cooled radiation targets of this invention.

FIG. 6 is a top plan of the radiation target shown in FIG. 5, with a section of the top being broken away to illustrate the positionment of its interior baffles.

DETAILED DESCRIPTION

Figure 2:
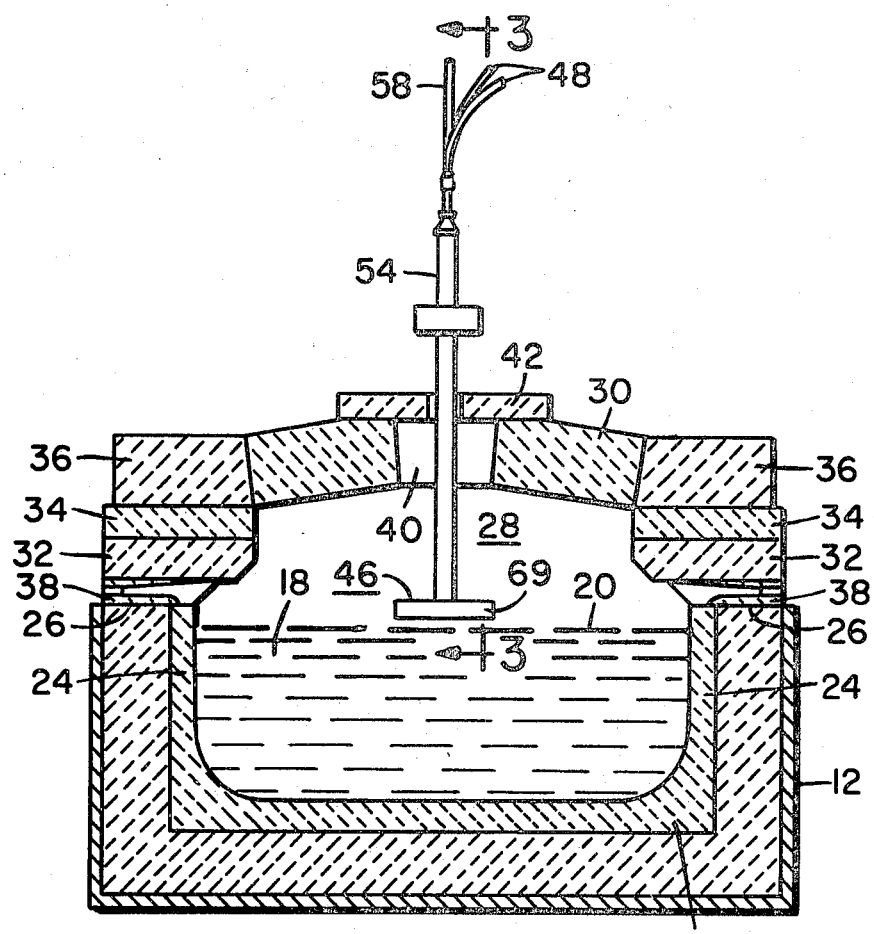
FIG. 2 is an enlarged vertical view, taken along line 2—2 of FIG. 1, and illustrates the size and position of one of the thin radiation targets in relation to the glass surface.

Referring now to the drawings in detail, and more particularly to FIG. 1 thereof, there is shown a forehearth portion 12 of a glass making furnace 10 which also includes schematically indicated tank and bowl portions 14 and 16 to the left and right of forehearth portion 12, respectively. Although not restricted thereto, the present invention is particularly well adapted for use with the so-called Vello-type forehearth. As indicated by the arrow in FIG. 1, a glass stream 18, having surface or glassline 20, flows from left to right. FIG. 2, which is an enlarged vertical view taken along line 2—2 of FIG. 1, best shows the construction of forehearth 12 which comprises a channel structure 22, generally of U-shape in cross section, adapted to accommodate glass stream 18, of substantial depth, between sidewalls 24 thereof.

Glass stream 18 is shown as filling forehearth channel 22 to a level slightly below that of the plane of the top surfaces 26 of channel sidewalls 24, as is usual in the operation of such a forehearth. In this forehearth, a space 28 a substantial area, in vertical section is provided above glass stream 18, beneath a forehearth roof or crown structure, generally designated by numeral 30, which is spaced above sidewall top surfaces 26 by suitable sidewall blocks 32, 34, 36. Interposed between the lower surface of side blocks 32 and surfaces 26 are burner blocks 38.

Crown or roof structure 30 is provided with multiple, generally rectangular openings or vents 40, which in turn are closed by removable damper or closure blocks 42.

Figure 3:
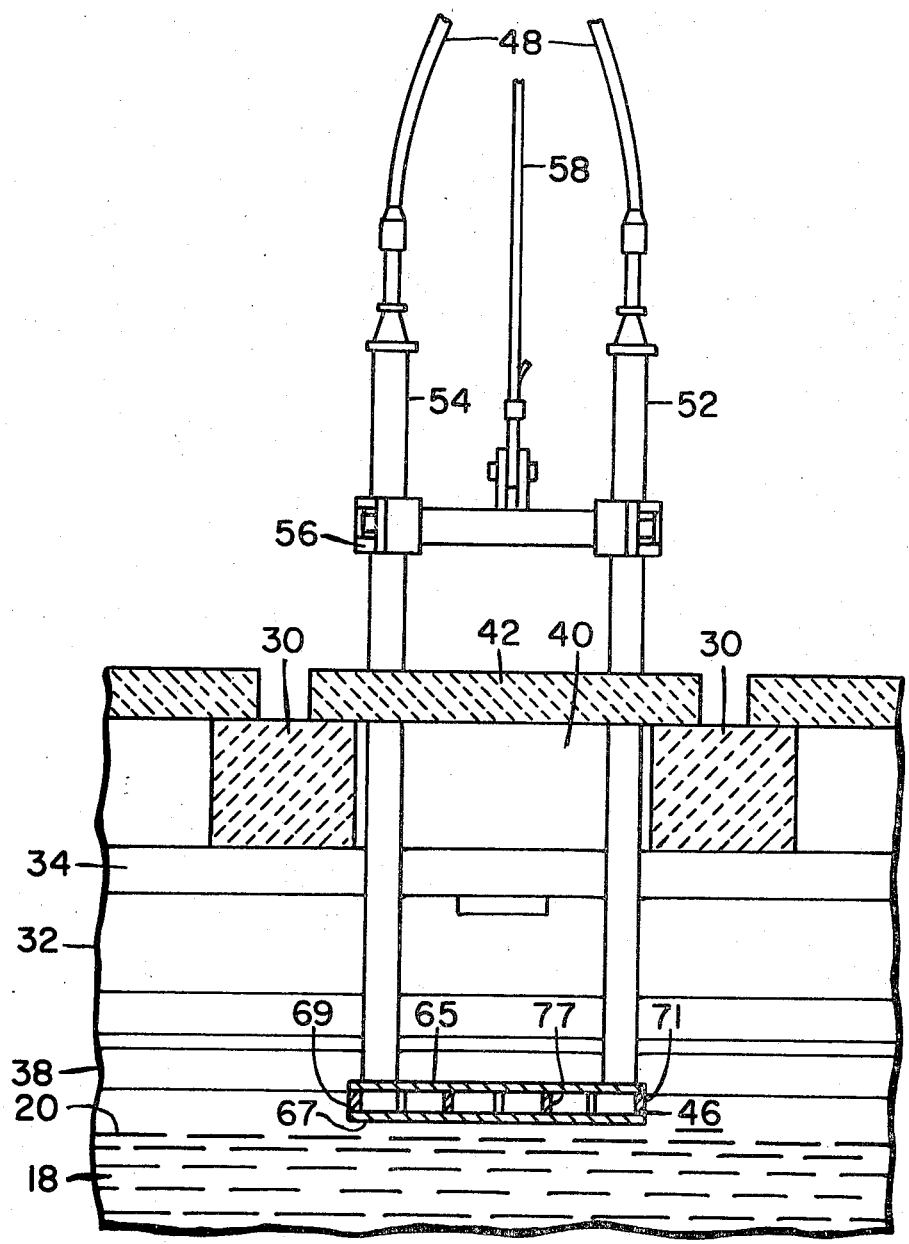
FIG. 3 is a vertical view, taken along line 3—3 of FIG. 2, and again illustrates the size and position of the thin radiation target with respect to the glass surface.

As best seen in FIG. 3, extending through one or more of openings 40 and apertures in closure blocks 42, is one embodiment of the thin, adjustable, fluid-cooled radiation targets or heat exchangers 46 of this invention. Target 46 is suspended to be relatively, vertically adjustable over molten glass surface 20 of glass stream 18 flowing inside the forehearth.

The coolant or heat exchange fluid passing through the target 46, which absorbs heat from glass surface 20, may be water, air, or any other suitable coolant material. The coolant circulates and releases heat in the customary manner through conduit portions 48. The coolant enters radiation target 46 in fluid entry pipe 52 and flows from the target in fluid exit pipe 54. The fluid pipes are maintained in a spaced-apart relationship with a split collar assembly 56. Adjustable, fluid-cooled, radiation target 46 is suspended above the molten glass surface 20 and its vertical position relative to surface 20 can be controlled by a height adjustment cable 58 which is attached to a split collar assembly 56 by a conventional mechanical linkage.

The glass is selectively cooled by relatively varying the distance between radiation target or radiator 46 and the glass. When radiator 46 is positioned within a fraction of an inch of the molten glass surface 20, the surface of the glass which passes directly under it is cooled. As the relative distance between radiator 46 and glass stream 18 is increased the effective area of surface cooled increases accordingly. Temperatures of glass surface 20 fluctuate as the interim distance decreases and increases.

Figure 4:
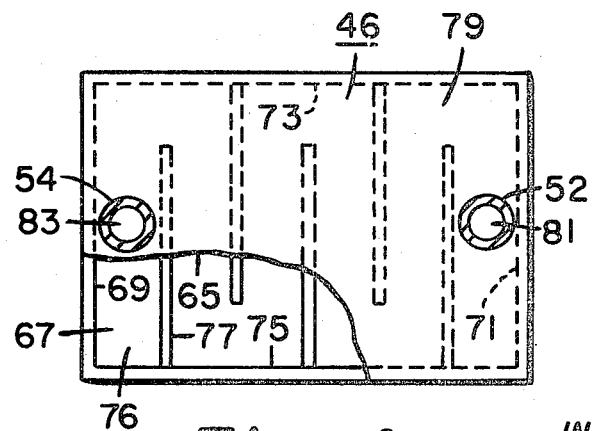
FIG. 4 is the top plan view of the thin, adjustable, fluid-cooled radiation targets shown in FIGS. 1-3, having a section of the top broken away to illustrate the positionment of its interior baffles.

Adjustable, fluid-cooled, radiation target 46, as best seen in FIG. 4, is formed of stainless steel or any other suitable high heat-conductive material having a top wall panel 65, bottom wall panel 67, end wall panels 69 and 71, and sidewall panels 73, 75, thus defining a low-profile closed boxlike chamber 76. The fluid coolant enters target 46 inside fluid entry pipe 52, which protrudes through the top wall panel 65, thus allowing coolant to enter the target interior. Inside of radiation target 46, the fluid is forced through a tortuous path or passageway 79, to flow to every portion of the interior by a series of baffles or bosses 77. Baffles 77 are located intermediate end wall panels 69, 71 and are suitably attached to the top wall and bottom wall panels 65, 67, respectively. Baffles 77 are maintained in a spaced, parallel relationship and are alternately, inwardly depending from opposed side wall panels 73 and 75. While each separate baffle 77 depends for a definite distance alternately from sidewall panels 73 and 75, respectively, it does not completely block the flow of coolant fluid. It should be noted that sidewall surfaces 73, 75 are spaced for substantial distances from forehearth channel sidewalls 24.

FIGS. 5 and 6 are end and top plan views respectively, of a further embodiment of the thin, adjustable, fluid cooled radiation targets 86 of this invention. In contrast to target 46, which is generally rectangular when seen from either end, target 86 is generally of truncated triangular shape or more specifically it has the shape of an isosceles trapezoid when seen from either end (see FIG. 5). Radiation target 86 is again formed of stainless steel or other suitable material having high-heat conductivity and is comprised of top wall panel 87, sidewall panels 89 and 91, bottom wall panel 93, and end wall panels 95 and 97, thus defining a low-profile closed chamber 98. Similar to target 46, fluid coolant enters target 86 inside fluid entry pipe 52 which protrudes through top center wall panel 87, thus allowing coolant to enter the target interior. Inside of radiation target 86, the fluid is forced through a tortuous path or passageway 96 to flow to every portion of the interior by a series of baffles or bosses 99. Baffles 99 are located intermediate end wall panels 95, 97 and are suitably attached to top and bottom wall panels 87, 93 respectively. Baffles 99 are maintained in a spaced, parallel relationship and are alternately, inwardly depending from sidewall panels 89 and 91. None of baffles 99, similar to baffles 77, completely blocks the flow of coolant fluid. It should be noted that sidewall panels 89, 91 are not perpendicular to top and bottom wall panels 87, 93 and are spaced for substantial distances from channel side walls 24.

Thus there have been provided radiation targets or chambers 46 and 86 affording, by the use of baffles 77 and 99 respectively, a tortuous, circuitous path or loop for the heat abstracting fluid, thereby achieving the ultimate thermodynamic effect for the system. The illustrated method is only one method of forming the fluid path in radiation targets 46, 86 and this invention is not to be considered as being restricted to this one method.

In operation, the cooling fluid, such as for example cold water, flows initially toward the radiation targets in the fluid entry pipe 52. An entry port 81, at the open end of the entry pipe, provides admittance to the target. The fluid then circulates through the zigzag course set up by baffles 77 and 99 in targets 46, and 86 respectively, and abstracts heat therefrom and upon becoming heated, leaves through an exit port 83. Exit port 83, which is at the open end of fluid exit pipe 54, discharges the cooling fluid, which then flows away from targets 46 and 86 in fluid exit pipe 54. During the passage of the cooling fluid, in the manner just described, heat is selectively absorbed from molten glass surface 20 underneath targets 46 and 86, thereby effectively cooling glass stream 18.

It should be noted that the effective radiation area can be increased by multiple radiation target installations such as these shown in FIG. 1. It is further noted that the radiation targets are assembled in a fashion so as to prevent any emission of the fluid coolant as it passes into, through and out of the targets. Suitable flow measuring gauges, valves, and incoming and outgoing water temperature thermometers permit determining the exact degree of cooling realized from each radiator and its effect on the flowing molten glass surface in the forehearth of the glass making furnace.

Figure 7:
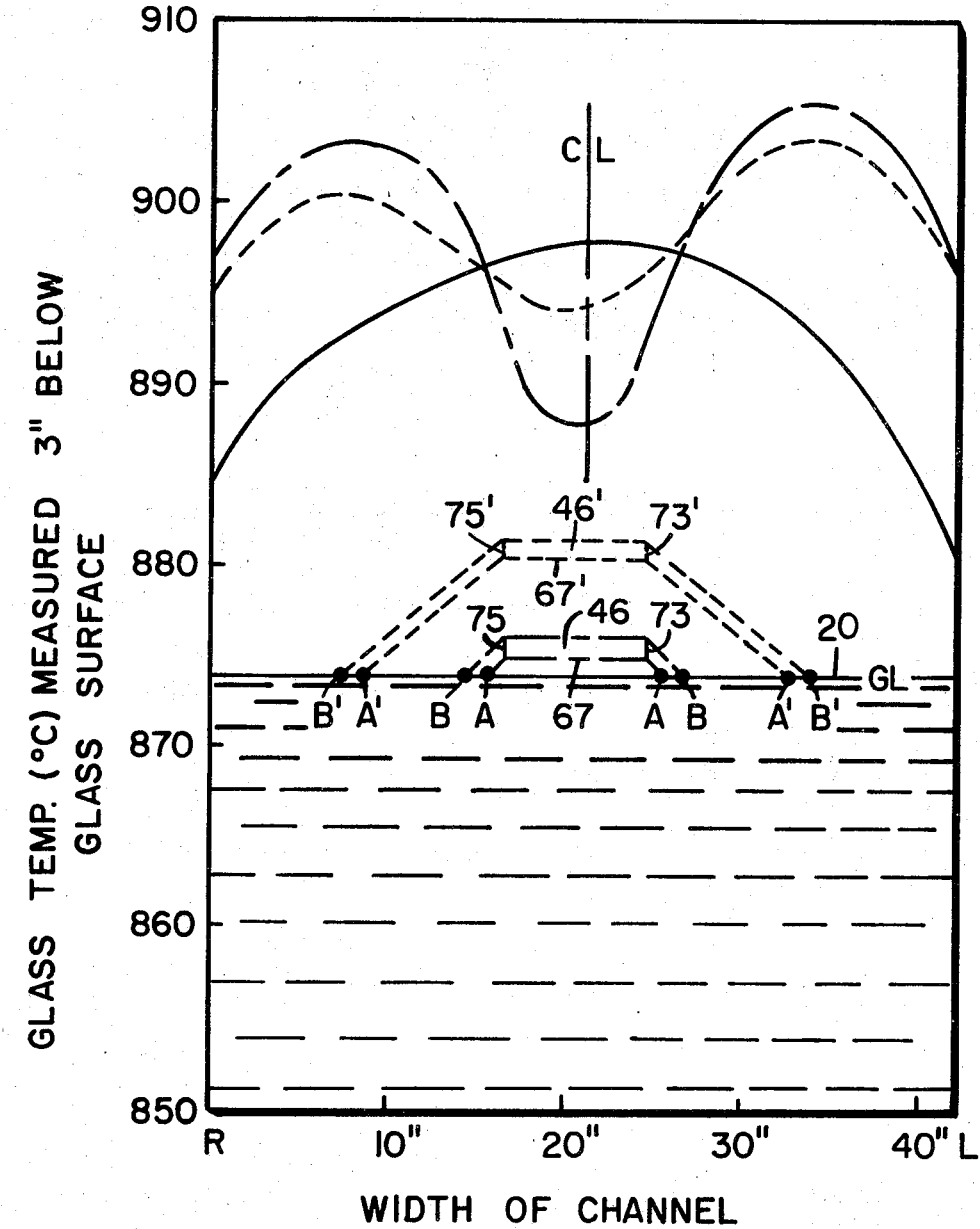
FIG. 7 is a graph showing the different glass stream temperature distributions across the width of a glass making furnace forehearth when using wind cooling and radiation target cooling.

FIG. 7 is a graph showing the different glass stream temperature distributions, measured (in °C.) at about 3 inches below the the glass surface, across the width of a furnace forehearth, such as between channel sidewalls 24, shown in FIG. 2. These temperature distributions were measured just downstream of line 2—2 of FIG. 1 and show the difference between wind cooling and the cooling resulting from the use of radiation targets 46 and 86 of this invention. Wind cooling in addition to producing a generally parabolic velocity distribution of the surface of the glass also produces, as shown in FIG. 7, a paraboliclike temperature distribution across the width of forehearth channel, i.e., the edge glass is considerably cooler in comparison with the center glass portion. In wind cooling, the edge glass, which moves very slowly, is simultaneously cooled while trying to cool the relatively faster moving center glass, thus requiring additional expensive energy from the firing system to restore the heat lost in the edges.

Radiation target cooling, on the other hand, selectively cools essentially only the center surface portion of the molten glass stream. As shown in FIG. 7, differing height adjustments of the radiation targets will control the temperature distribution but with a minimum effect on the glass stream edges, with the total amount of heat being removed staying substantially constant.

One of the most important advantages of the present invention is that both radiation targets 46 and 86 are of a low-profile design, i.e., defining closed chambers 76, 98, respectively, of relatively long lengths and widths in comparison to their thickness. For example, a radiation target 46, approximately 12 inches long, 8 inches wide and 1.5 inches high has been used with excellent results. The large, generally rectangularly shaped bottom wall panels 67 and 93 of targets 46 and 86, respectively, are substantially planar with the surface portion of glass surface 20. Sidewall panels 73, 75 of target 46 and sidewall panels 89, 91 of target 86 have comparatively small areas (with respect to the areas of bottom wall panels 67 and 93 respectively) and thereby have a minimum effect on glass surface 20. As shown in FIGS. 2 and 3 with respect to target 46 (but also applicable to target 86), top wall panel 65 is spaced a substantial distance below forehearth roof structure 30. The effect of small sidewall areas is best illustrated in FIG. 7 wherein target 46 is shown as being positioned about one half inch (not to scale) from glass surface 20, while target 46' is positioned about six inches (not to scale) from glass surface 20. The total effective radiation widths of targets 46 and 46' are the lengths between points B—B and B'—B' respectively, and the effective radiation widths of their bottom wall panels 67 and 67' are the lengths between points A—A and A'—A' respectively. While lengths A'—A' and B'—B' are substantially longer than lengths A—A and B—B, the effective radiation widths due to the height of sidewall panels 73, 75 and 73', 75' namely the lengths A-B, B-A and A'-B', B'-A' remain substantially similar. It should be noted that sidewall panels 89, 91 of radiation target 86 (as best seen in FIG. 5) are angled in such a manner that they contribute virtually no components to the total effective radiation width of target 86. The total effective radiation width is therefore the effective radiation width of bottom wall panel 93, with this width varying (depending upon the position of target 86 with respect to glass surface 20) in a manner similar to that of previously described radiation targets 46 and 46'.

Effective forehearth cooling may be obtained by the use of multiple radiation target installations such as those shown in forehearth 12 of FIG. 1 which have completely replaced the previously used wind cooling system. The working height of each target 46 (or 86) may be individually adjusted if so desired or they may be adjusted progressively to obtain the particularly desired glass temperature distribution.

In addition to obtaining effective forehearth cooling, the use of multiple radiation targets 46 and/or 86 also provides important temperature control advantages for furnace forehearths.

The objectives of an effective forehearth temperature control system are the abilities to:

a. Obtain a representative temperature measurement.
  b. Quickly detect and correct for temperature changes and hold a homogenious temperature distribution.
  c. Hold or stabilize these ideal temperature conditions.

The thin radiation targets of this invention make major control contributions to the above objectives in the following ways:

1. Radiation targets make heat removal essentially a constant (whereas it is a variable with wind cooling). This achieves more stable control conditions without upsets from cooling variation. In addition, the crossover point between cooling and heating is eliminated and thus obviates a frequent control problem.

2. Radiation targets afford the ability to obtain a more representative temperature measurement and thereby make it possible to detect and control a more accurate measurement of the cross section of the molten glass. This is achieved because the radiation targets do not have a variable affect on the measurement and therefore do not produce a variable effect from the control system, which leads to instability. In addition, the cooling effect is not spotty (as in wind cooling) but is, instead, averaging and provides a better overall measurement both horizontally and vertically. As shown in FIG. 7, the temperature differential between the center and the edges of the glass stream surface can be appreciably greater with wind cooling.

3. Radiation targets do not create the changing atmospheric pressure effect of wind cooling and, therefore, measuring elements are not substantially effected by this type of cooling. This is a significant advantage because pressure effects create not only instability of measurement and control but also inaccurate or reversed measurement of temperature.

Thus it may be seen that the adjustable low-profile radiation targets of this invention selectively cool the center surface portion of the molten glass stream. In addition, they make major furnace forehearth temperature control contributions by making heat removal essentially a constant, afford the ability to obtain a more representative temperature measurement and eliminate the changing atmospheric pressure effect of wind cooling.

While this invention has been described in connection with possible forms or embodiments thereof, it is to be understood that changes or modifications may be resorted to without departing from the spirit of the invention or scope of the claims which follow.

What is claimed is:

1. In the forehearth of a glass making furnace having a molten glass stream, with a fast moving center surface portion and slow moving side surface portions, flowing therethrough and means for cooling essentially only the center surface portion of said molten glass stream, said means including at least one radiation target of the type having a high-heat conductive material in close proximity to said central surface portion and wherein said target includes a base surface portion, a top surface portion, a pair of end surfaces and a pair of side surfaces, which are connected together and define a low-profile closed chamber of shallow height compared to its length and width, a plurality of spaced-apart baffles connected to opposite wall panels within said chamber forming a circuitous passageway, means for circulating fluid through said passageway, and means for controlling the degree of cooling imparted by such fluid-cooled radiation target, the improvement comprising:
   a. said radiation target being generally of truncated triangular shape when viewed from an end in a direction parallel to said glass stream; and
   b. said side surfaces being inwardly converging with respect to said top surface portion so that said side surfaces contribute virtually no components to the effective radiation width of said radiation target, thereby obtaining maximum cooling of said fast moving glass stream center surface portion, while at the same time minimizing the cooling of said slow moving glass stream side surface portions.

2. Cooling means as defined in claim 1 wherein said side surfaces are generally rectangular, extend in the direction of flow of said glass stream, and are spaced a substantial distance from the edges of said glass stream.

3. Cooling means as defined in claim 1 including a plurality of said radiation targets arranged in tandem along the center surface portion of said glass stream, spaced a substantial distance from the edges of said stream and individually adjustable and controllable; and said side surfaces forming acute angles with said base surface portion and obtuse angles with said top surface portion thereby producing no discernible cooling effect on the edge portions of said glass stream.

4. In combination with a glass-making furnace forehearth, having a roof portion, and a molten glass stream, with a fast moving center surface portion and slow moving side surface portions, flowing therethrough,
   a. a plurality of individually adjustable and controllable thin, fluid-cooled radiation targets of high-heat conductive material, adapted to selectively cool essentially only the fast moving center surface portion of a stream of molten glass for a preselected length of said furnace forehearth, said radiation targets being arranged in series above said center surface, with each of said radiation targets including:
      $a_1$. a plurality of connected panels defining a low-profile closed chamber including a base panel substantially parallel to the surface of said glass stream, a top panel spaced a substantial distance below said forehearth roof portion, a pair of end panels, and a pair of side panels, said side panels being inwardly converging with respect to said top panel and forming acute angles with said base panel and obtuse angles with said top panel so that said side panels contribute virtually no components to the effective radiation width of said radiation targets;
      $a_2$. a plurality of spaced baffles connected to opposed panels within said chamber and together therewith defining a circuitous fluid passageway through said chamber,
      $a_3$. a vertical, top-mounted fluid entry port near one end of said fluid passageway, and
      $a_4$. a vertical, top-mounted fluid exit port near the other end of said fluid passageway;
   b. means for permitting cooling fluids to enter said fluid entry ports;
   c. means for permitting said fluids to exit from said fluid exit ports after having passed through said fluid passageways; and
   d. means for controlling the degree of cooling imparted by said fluid-cooled radiation targets, including means for individually and selectively positioning each of said radiation targets within a predetermined position above said glass stream center surface portion, thereby obtaining maximum cooling of said fast moving center surface portion and minimum cooling of said slow moving side surface portions.

5. A method for selectively cooling essentially only the fast moving center surface portion, without disturbing the slow moving side surface portions, of a stream of molten glass passing through a glass making furnace forehearth, said method comprising:
   a. positioning a plurality of low-profile individually adjustable heat exchangers of high-heat conductive material, having connected-together base surface portions, top surface portions, pairs of end surfaces and pairs of side surfaces, above the center surface portion only of said molten glass stream, over the full length of said furnace forehearth, said heat exchangers being generally of truncated triangular shape when viewed from an end in a direction parallel to said glass stream and said side surfaces being inwardly converging with respect to said top surface portions;
   b. circulating a heat exchange fluid through said heat exchangers;
   c. extracting the maximum possible amount of heat by radiation from said glass stream center surface portion by said heat exchanger base surface portions;
   d. extracting the minimum possible amount of heat by radiation, from said glass stream side surface portions by said heat exchanger side surface portions; and
   e. varying the rate of extraction of heat by radiation from said glass stream center surface portion by changing the vertical distances of said heat exchangers from said glass stream center surface portion.

* * * * *